(12) United States Patent
Swenson et al.

(10) Patent No.: US 8,443,398 B2
(45) Date of Patent: May 14, 2013

(54) ARCHITECTURE FOR DELIVERY OF VIDEO CONTENT RESPONSIVE TO REMOTE INTERACTION

(75) Inventors: Erik R. Swenson, San Jose, CA (US);
Nitin Bhandari, Fremont, CA (US);
Michael Guzewicz, Campbell, CA (US);
Nirmal Nair, San Jose, CA (US)

(73) Assignee: Skyfire Labs, Inc., Mountain View, CA (US)

( * ) Notice: Subject to any disclaimer, the term of this patent is extended or adjusted under 35 U.S.C. 154(b) by 566 days.

(21) Appl. No.: 11/929,773

(22) Filed: Oct. 30, 2007

(65) Prior Publication Data

US 2008/0104652 A1 May 1, 2008

Related U.S. Application Data

(60) Provisional application No. 60/863,888, filed on Nov. 1, 2006.

(51) Int. Cl.
*H04N 5/445* (2011.01)
(52) U.S. Cl.
USPC ........... 725/54; 725/117; 348/441; 348/384.1
(58) Field of Classification Search .................. 709/203, 709/228, 231–235
See application file for complete search history.

(56) References Cited

U.S. PATENT DOCUMENTS

| 5,708,511 | A | 1/1998 | Gandhi et al. |
| 5,727,159 | A | 3/1998 | Kikinis |
| 5,821,915 | A | 10/1998 | Graham et al. |
| 6,038,257 | A | 3/2000 | Brusewitz et al. |
| 6,266,817 | B1 | 7/2001 | Chaddha |
| 6,275,534 | B1 | 8/2001 | Shiojiri |
| 6,282,240 | B1 | 8/2001 | Fukunaga et al. |
| 6,292,834 | B1 * | 9/2001 | Ravi et al. ...................... 709/233 |

(Continued)

FOREIGN PATENT DOCUMENTS

| JP | 2003-259310 A2 | 9/2003 |
| JP | 2006-270690 A | 10/2006 |
| WO | WO 2005/081528 A1 | 9/2005 |

OTHER PUBLICATIONS

PCT International Search Report and Written Opinion, PCT/US07/83218, Jun. 12, 2008, 7 pages.

(Continued)

*Primary Examiner* — Pankaj Kumar
*Assistant Examiner* — Timothy Newlin
(74) *Attorney, Agent, or Firm* — Fenwick & West LLP

(57) ABSTRACT

Systems and methods pertaining to a client-server architecture for communicating video frames across a network are disclosed. In one embodiment, a system includes a first engine residing on a first device, with the first engine adapted to encode a succession of video frames of a user interface of a program for transmission across the network. The encoding of the video frames is based on one or more feedback parameters and includes video compression techniques. In the same embodiment, the system includes a first command process engine operatively coupled to the program. In the same embodiment, the system includes a second engine residing on a second device, the second engine adapted to decode the succession of video frames after transmission across the network. In the same embodiment, the system includes a second command process engine operatively coupled to the first command process engine and adapted to communicate user input of the second device to the program via the first command process engine.

23 Claims, 10 Drawing Sheets

U.S. PATENT DOCUMENTS

| | | | |
|---|---|---|---|
| 6,397,230 B1 | 5/2002 | Carmel et al. | |
| 6,496,203 B1 | 12/2002 | Beaumont et al. | |
| 6,529,552 B1 | 3/2003 | Tsai et al. | |
| 6,563,517 B1 | 5/2003 | Bhagwat et al. | |
| 6,578,201 B1 * | 6/2003 | LaRocca et al. | 725/86 |
| 6,584,493 B1 * | 6/2003 | Butler | 709/204 |
| 6,704,024 B2 | 3/2004 | Robotham et al. | |
| 6,990,534 B2 | 1/2006 | Mikhailov et al. | |
| 7,016,963 B1 | 3/2006 | Judd et al. | |
| 7,043,745 B2 | 5/2006 | Nygren et al. | |
| 7,054,365 B2 | 5/2006 | Kim et al. | |
| 7,088,398 B1 | 8/2006 | Wolf et al. | |
| 7,116,843 B1 | 10/2006 | Wensley et al. | |
| 7,257,158 B1 | 8/2007 | Figueredo et al. | |
| 7,483,575 B2 | 1/2009 | Fukuhara et al. | |
| 7,821,953 B2 | 10/2010 | Yarlagadda et al. | |
| 2002/0059368 A1 * | 5/2002 | Reynolds | 709/203 |
| 2002/0067353 A1 | 6/2002 | Kenyon et al. | |
| 2002/0122491 A1 | 9/2002 | Karczewicz et al. | |
| 2002/0131083 A1 | 9/2002 | Hamzy et al. | |
| 2003/0020722 A1 | 1/2003 | Miura et al. | |
| 2003/0039312 A1 | 2/2003 | Horowitz et al. | |
| 2003/0079222 A1 | 4/2003 | Boykin et al. | |
| 2003/0122954 A1 | 7/2003 | Kassatly | |
| 2003/0132957 A1 | 7/2003 | Ullmann et al. | |
| 2003/0138050 A1 | 7/2003 | Yamada et al. | |
| 2003/0177269 A1 * | 9/2003 | Robinson et al. | 709/246 |
| 2003/0227977 A1 | 12/2003 | Henocq | |
| 2004/0022322 A1 | 2/2004 | Dye | |
| 2004/0067041 A1 | 4/2004 | Seo et al. | |
| 2004/0083236 A1 | 4/2004 | Rust | |
| 2004/0109005 A1 | 6/2004 | Witt et al. | |
| 2004/0184523 A1 | 9/2004 | Dawson et al. | |
| 2004/0217980 A1 | 11/2004 | Radburn et al. | |
| 2005/0052294 A1 | 3/2005 | Liang et al. | |
| 2005/0081158 A1 * | 4/2005 | Hwang | 715/740 |
| 2005/0089092 A1 | 4/2005 | Hashimoto et al. | |
| 2005/0100233 A1 | 5/2005 | Kajiki et al. | |
| 2005/0105619 A1 | 5/2005 | Lee et al. | |
| 2005/0132286 A1 | 6/2005 | Rohrabaugh et al. | |
| 2005/0147247 A1 | 7/2005 | Westberg et al. | |
| 2005/0195899 A1 | 9/2005 | Han | |
| 2005/0232359 A1 | 10/2005 | Cha | |
| 2005/0257167 A1 | 11/2005 | Fraleigh et al. | |
| 2005/0267779 A1 * | 12/2005 | Lee et al. | 705/1 |
| 2006/0018378 A1 | 1/2006 | Piccinelli et al. | |
| 2006/0069797 A1 * | 3/2006 | Abdo et al. | 709/231 |
| 2006/0078051 A1 | 4/2006 | Liang et al. | |
| 2006/0095944 A1 | 5/2006 | Demircin et al. | |
| 2006/0150224 A1 | 7/2006 | Kamariotis | |
| 2006/0168101 A1 | 7/2006 | Mikhailov et al. | |
| 2006/0174026 A1 | 8/2006 | Robinson et al. | |
| 2006/0174614 A1 * | 8/2006 | Dong et al. | 60/444 |
| 2006/0184614 A1 * | 8/2006 | Baratto et al. | 709/203 |
| 2006/0210196 A1 | 9/2006 | Wensley et al. | |
| 2006/0218285 A1 * | 9/2006 | Talwar et al. | 709/227 |
| 2006/0233246 A1 | 10/2006 | Park et al. | |
| 2006/0282855 A1 * | 12/2006 | Margulis | 725/43 |
| 2006/0285594 A1 | 12/2006 | Kim et al. | |
| 2006/0291561 A1 | 12/2006 | Seong et al. | |
| 2007/0098283 A1 | 5/2007 | Kim et al. | |
| 2007/0116117 A1 | 5/2007 | Tong et al. | |
| 2007/0121720 A1 | 5/2007 | Yamane et al. | |
| 2007/0250711 A1 | 10/2007 | Storey | |
| 2008/0062322 A1 | 3/2008 | Dey et al. | |
| 2008/0065980 A1 | 3/2008 | Hedbor | |
| 2008/0071857 A1 | 3/2008 | Lie | |
| 2009/0245668 A1 | 10/2009 | Fukuhara et al. | |

OTHER PUBLICATIONS

PCT International Search Report and Written Opinion, PCT/US07/83214, Apr. 30, 2008, 7 pages.

PCT International Search Report and Written Opinion, PCT/US07/83203, Apr. 3, 2008, 9 pages.

Hsieh, M-D. et al., "Stateful Session Handoff for Mobile WWW," Revised Form Jan. 27, 2005, Accepted Feb. 26, 2005, Information Sciences, Elsevier, pp. 1241-1265, vol. 176.

Hsieh, M. et al., "Stateful Session Handoff for Mobile WWW," Information Sciences 2005, [online] [Retrieved Apr. 10, 2008] Retrieved from the Internet<URL:http:140.115.51.197/web/PaperManage/Paper/Stateful%20session%20handoff%20for%20mobile%20WWW.pdf>.

"NewFront Browser v3.4," Access Co., Ltd., Nov. 30, 2006 [online] [Retrieved on Jul. 11, 2008] Retrieved from the Internet<URL:http://www.access.company.com/PDF/NetFront/120406_NFv34.pdf>.

PCT International Search Report and Written Opinion, PCT/US08/52129, Jul. 23, 2008, 7 pages.

PCT International Search Report and Written Opinion, PCT/US08/52092, Jul. 14, 2008, 9 pages.

Warabino, T. et al., "Video Transcoding Proxy for 3G Wireless Mobile Internet Access," IEEE Communications Magazine, Oct. 2000, pp. 66-71.

Japanese Office Action, Japanese Application No. 2009-534948, Feb. 18, 2013, 4 pages.

\* cited by examiner

ARCHITECTURE FOR DELIVERY OF VIDEO CONTENT RESPONSIVE TO REMOTE INTERACTION

CROSS-REFERENCE TO RELATED APPLICATION

The present application claims priority under 35 U.S.C. §119(e) to U.S. Provisional Patent Application No. 60/863,888, filed on Nov. 1, 2006, entitled "CONTENT ACCESS USING COMPRESSION," which is incorporated by reference in its entirety.

BACKGROUND

The present invention relates to an architecture for the delivery of video content responsive to remote interaction. In particular, the present invention is related to communicating a succession of video frames to a device in an interactive manner.

Client-server architectures are used in various contexts in many different types of network environments. In some network environments, bandwidth limitations comprise one of the chief limiting factors in utilizing a client-server architecture. Such bandwidth-constrained environments may occur in both wired and wireless networks, including combinations/hybrids of such networks. Taking the example of a wireless network, client devices may additionally be resource-constrained with respect to device capabilities, including, for instance, processing power, memory and power (i.e., battery) limitations. End-user applications that consume relatively large amounts of bandwidth and processing power, such as web browser applications, may provide unsatisfactory user experiences when run on a mobile client device. These unsatisfactory user experiences often result from a poor ability to provide the fast-paced interactivity expected of web browsing sessions. Many mobile client devices, such as cellular phones, may not be capable of adequately supporting full-featured versions of such applications.

Compounding this, websites are continually becoming more feature-rich, and increasingly make use of various ancillary software (such as animation plugins), which are not supported on many mobile client devices. Video transmission of content to many mobile client devices also often provides an unsatisfactory user experience due to bandwidth limitations and the inability of existing client-server architectures to adequately adjust to this limitation. There exists a need to support a full-featured web browsing experience on a diverse cross-section of bandwidth and capability-limited mobile devices, as well as to support the use of other applications on these same devices. Embodiments of this invention will address other needs as well.

SUMMARY

In various embodiments, the present invention provides systems and methods pertaining to an architecture for communicating video frames across a network. In one embodiment, a system includes a first engine residing on a first device, with the first engine adapted to encode a succession of video frames of a user interface of a program for transmission across the network. The encoding of the video frames is based on one or more feedback parameters and includes video compression techniques. In the same embodiment, the system includes a first command process engine operatively coupled to the program. In the same embodiment, the system includes a second engine residing on a second device, the second engine adapted to decode the succession of video frames after transmission across the network. In the same embodiment, the system includes a second command process engine operatively coupled to the first command process engine and adapted to communicate user input of the second device to the program via the first command process engine.

In another embodiment, an audio stream associated with the succession of video frames is also encoded and decoded. In yet another embodiment, there are a plurality of programs with user interfaces, with each of the plurality of programs having a corresponding plurality of first engines and a corresponding plurality of first command process engines. Further, the plurality of programs are running in one instance of an operating system, and a user manager engine is adapted to load balance encoding successions of video frames of each of the plurality of programs for transmission across the network to a corresponding plurality of second devices.

In a further embodiment, such a second device includes a viewing application, where the viewing application is operatively coupled to the first engine and adapted to display the succession of video frames. In the same embodiment, the viewing application is further operatively coupled to the command process engine and adapted to facilitate communicating user input to the program.

In still another embodiment, a method includes intercepting a plurality of audio streams corresponding to the plurality of programs, associating each of the plurality of audio streams with one of a plurality of process identifiers corresponding to the plurality of programs, encoding the plurality of audio streams, and routing the plurality of audio streams based on the associated process identifiers.

One skilled in the art will recognize that the present invention can be implemented in a wide variety of systems and methods.

Figure 1:
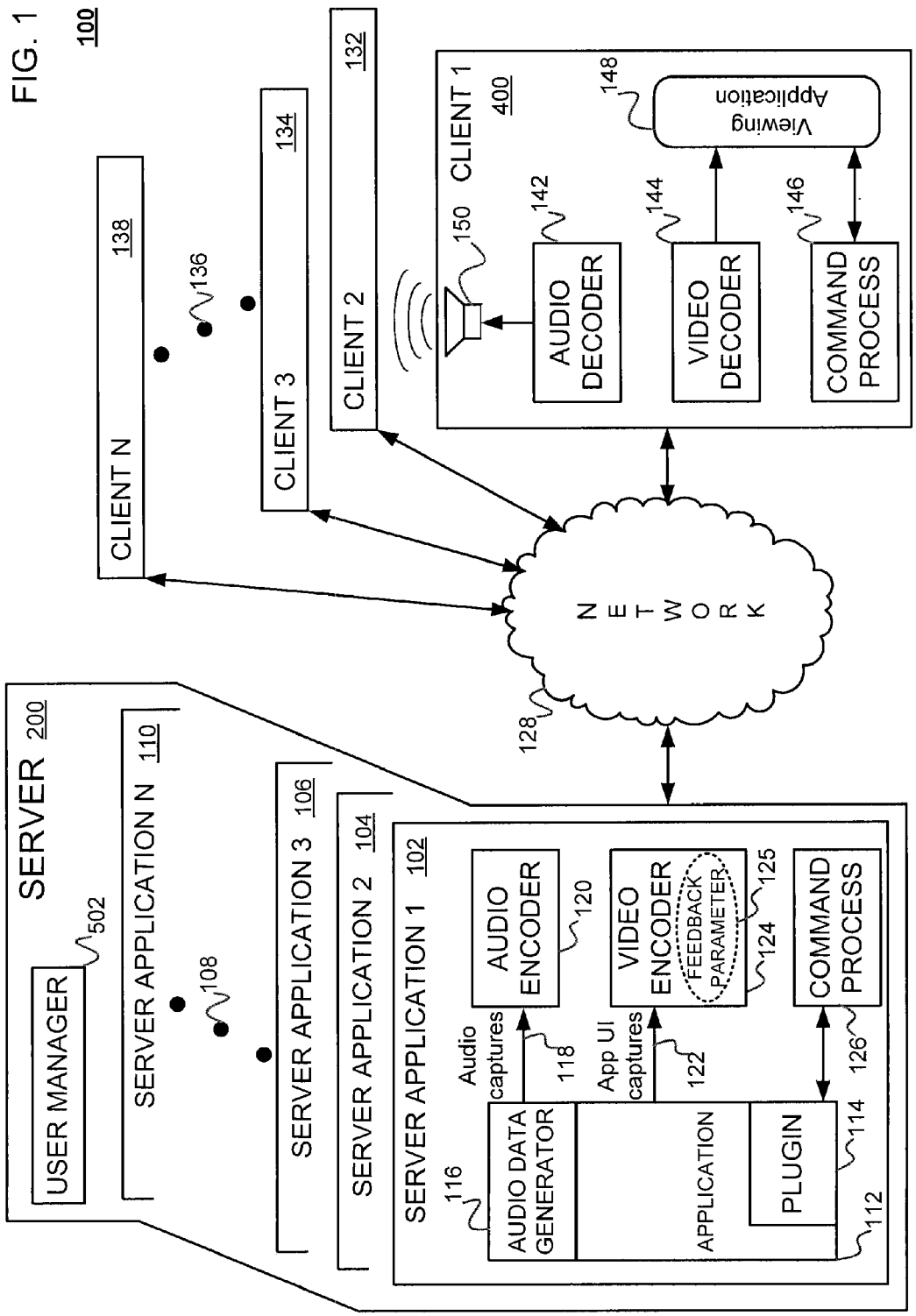
FIG. 1 is a block diagram illustrating some aspects of a client-server architecture of the present invention, according to one embodiment.

One skilled in the art will recognize that these Figures are merely examples of the operation of the invention according to one or some embodiments, and that other architectures, method steps, exchanges and modes of operation can be used without departing from the essential characteristics of the invention.

DETAILED DESCRIPTION OF THE EMBODIMENTS

The present invention is now described more fully with reference to the accompanying Figures, in which one or some embodiments of the invention are shown. The present invention may be embodied in many different forms and should not be construed as limited to the embodiments set forth herein. Rather these embodiments are provided so that this disclosure will be complete and will fully convey principles of the invention to those skilled in the art.

For illustrative purposes, embodiments of the invention are described in connection with a server or a mobile client device, such as an example mobile client device. Various specific details are set forth herein regarding embodiments with respect to servers and mobile client devices to aid in understanding the present invention. However, such specific details are intended to be illustrative, and are not intended to restrict in any way the scope of the present invention as claimed herein. In particular, one skilled in the art will recognize that the invention can be used in connection with a wide variety of contexts, including, for example, client devices operating in a wired network. In addition, embodiments of the invention are described in connection with a web browsing application, but such descriptions are intended to be illustrative and examples, and in no way limit the scope of the invention as claimed. Various embodiments of the invention may be used in connection with many different types of programs, including an operating system (OS), a wide variety of applications, including word processing, spreadsheet, presentation, and database applications, and so forth.

In some embodiments, the present invention is implemented at least partially in a conventional server computer system running an OS, such as a Microsoft OS, available from Microsoft Corporation; various versions of Linux; various versions of UNIX; a MacOS, available from Apple Computer Inc.; and/or other operating systems. In some embodiments, the present invention is implemented in a conventional personal computer system running an OS such as Microsoft Windows Vista or XP (or another Windows version), MacOS X (or another MacOS version), various versions of Linux, various versions of UNIX, or any other OS designed to generally manage operations on a computing device.

In addition, the present invention can be implemented on, or in connection with, devices other than personal computers, such as, for example, personal digital assistants (PDAs), cell phones, computing devices in which one or more computing resources is located remotely and accessed via a network, running on a variety of operating systems. The invention may be included as add-on software, or it may be a feature of an application that is bundled with a computer system or sold separately, or it may even be implemented as functionality embedded in hardware.

Output generated by the invention can be displayed on a screen, transmitted to a remote device, stored in a database or other storage mechanism, printed, or used in any other way. In addition, in some embodiments, the invention makes use of input provided to the computer system via input devices such as a keyboard (screen-based or physical, in a variety of forms), scroll wheels, number pads, stylus-based inputs, a touchscreen or touchpad, etc. Such components, including their operation and interactions with one another and with a central processing unit of the personal computer, are well known in the art of computer systems and therefore are not depicted here.

Any software portions described herein with reference to modules need not include discrete software modules. Any software configuration described herein is meant only by way of example; other configurations are contemplated by and within the scope of various embodiments of the present invention. The term, engine, is used herein to denote any software or hardware configuration, or combination thereof, that performs the function or functions referenced.

Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily refer to the same embodiment. The appearance of the phrase "in some embodiments" in various places in the specification are not necessarily all referring to the same set of embodiments. The appearance of the phrase "in various embodiments" in various places in the specification are not necessarily all referring to the same set of embodiments.

1. System

FIG. 1 is a block diagram illustrating some aspects of system 100 of the present invention, according to one embodiment. System 100 employs a client-server architecture that includes a number of server application instances running on server 200, including server application 1 (102), server application 2 (104), server application 3 (106), and a wide-ranging number of additional server applications (represented by ellipsis 108), up to server application n (110). The term "server application" is used herein to denote a server-side application, i.e., an application running on one or more servers. Server application n (110) represents the number of server application instances that happen to be running in system 100 at any given point. Server 200 also includes user manager module 502, which serves to manage multiple users among the multiple server application instances 102-110. User manager module 502 is described herein in FIG. 5, and represents one of potential multiple user managers running on server 200. Server 200 is running one instance of an OS underlying server applications 102-110. In another embodiment, server 200 may run multiple instances of an OS, each OS instance including one or more application instances.

While FIG. 1 illustrates multiple server applications 102-110, in other embodiments, a number of different types of programs may be alternately used, including, for instance, an OS. Server applications 102-110 illustrated in FIG. 1 may run on one server 200 or any number of servers, as, for example, in one or more server farm environments. Server applications 102-110 may each comprise instances of different server applications, or may all comprise an instance of one server application. For example, each server application 102-110 could comprise a separate instance of a web browsing application.

A. Server

Describing server application 1 (102) in further detail, as an example server application instance, server application 1 (102) includes application 112, plugin 114, audio data generator 116, audio encoder module 120, video encoder module 124, and command process module 126. Video encoder module 124 makes use of feedback parameter 125.

Video encoder module 124 is operatively coupled to application 112, and is adapted to receive a succession of captures (122) of the user interface (UI) of application 112 for encoding into video frames for transmission via network 128. The succession of captures (122) of the UI comprise data that is captured and transferred from application 112 to video encoder 124 by a separate module, described and illustrated in FIG. 2 (image management module 216). The term, user interface, as used throughout this disclosure, refers to all or a portion of any user interface associated with a wide variety of computer programs.

The encoding of application UI captures (122) is not limited to any particular encoding or video compression format, and may include a wide variety of video compression techniques, ranging from the use of a video compression standard, such as H.264, to an entirely customized form of video compression, to a modified version of a video compression standard, and so forth.

Audio encoder module 120 is operatively coupled to audio data generator 116 of application 112, and is adapted to transform audio captures 118 (e.g., an audio stream) of audio data generator 116 into an encoded audio stream for transmission via network 128. Audio captures 118 comprises data being transferred from audio data generator 116 to audio encoder module 120.

Audio data generator 116 is operatively coupled to application 112, and is adapted to generate the audio data accompanying application 112. Plugin 114 is operatively coupled to application 112 and command process module 126. Plugin 114 is adapted to facilitate the interface between application 112 and command process module 126.

Figure 2:
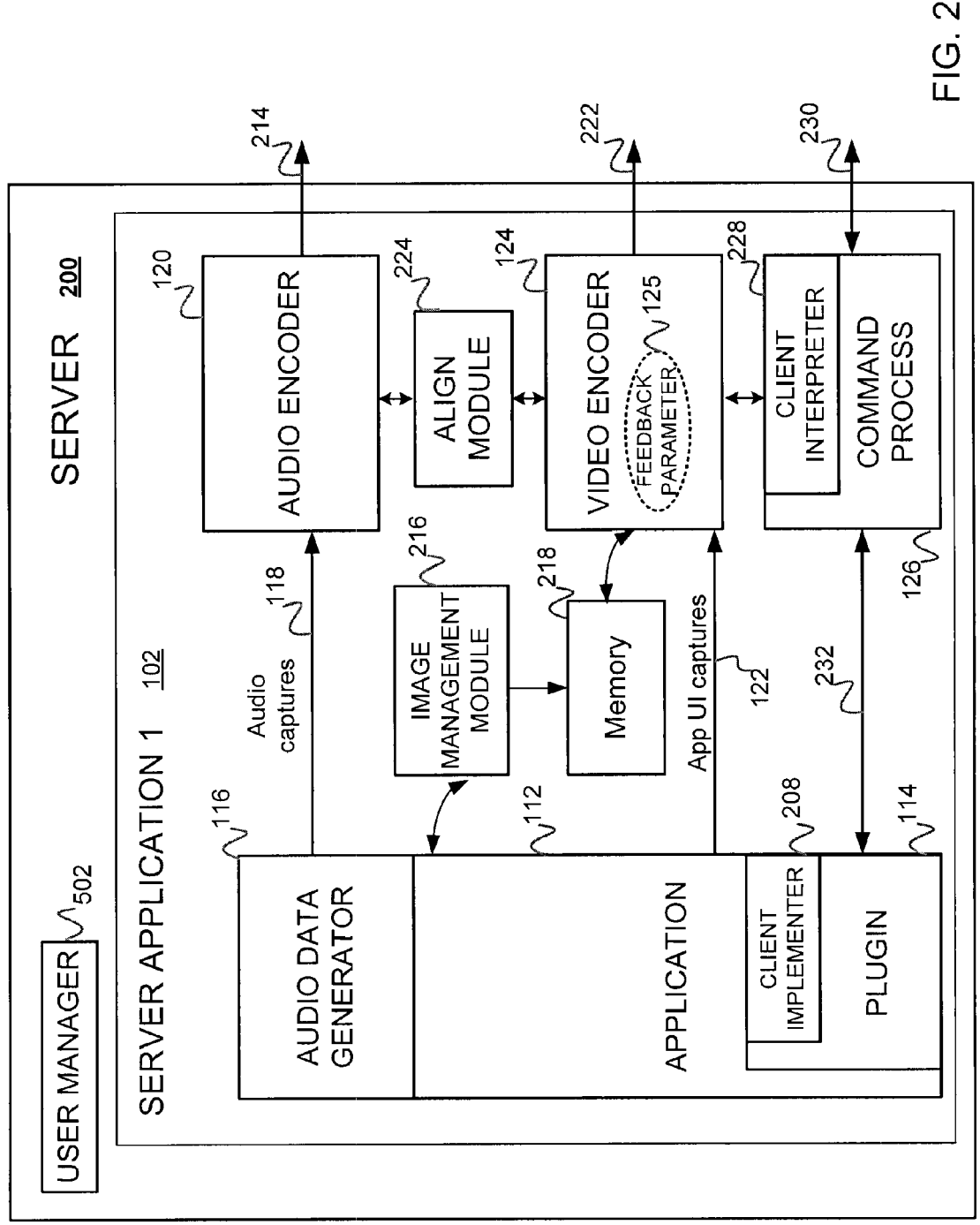
FIG. 2 is a block diagram illustrating some aspects of the present invention in connection with a server, according to one embodiment.

Server 200 is further described herein in FIG. 2.

C. Client

System 100 includes a number of clients, including client 1 (400), client 2 (132), client 3 (134), and a wide-ranging number of additional clients (represented by ellipsis 136), up to client n (138), with client n (138) representing the number of clients that happen to be engaged in the system at any given point. As illustrated in FIG. 1, the different clients comprise different, non-related client devices.

Describing client 1 (400) in further detail, as an example client, client 1 (400) may include audio decoder module 142, video decoder module 144, command process module 146, viewing application 148, and speaker 150. Video decoder module 144 may be adapted to decode the succession of video frames encoded by video encoder module 124, where the successive video frames have been transmitted across network 128 for reception by client 1 (400). Video decoder module 144 may be operatively coupled to viewing application 148, and adapted to communicate the decoded video frames to viewing application 148 for display of the video frames on client 1 (400).

Client 1 (400) includes speaker 150, and audio decoder module 142 is operatively coupled to speaker 150. Audio decoder module 142 is adapted to decode the audio captures encoded by audio encoder module 120, where the encoded audio has been transmitted across network 128 for reception by client 1 (400). After decoding the audio stream, audio decoder module 142 may communicate the decoded audio to speaker 150 for audio output from client 1 (400).

Viewing application 148 is adapted to receive user input and communicate the user input to command process module 146. Command process module 146 is adapted to communicate the user input back to command process module 126 of application 102 via network 128. Command process module 126 is adapted to communicate the user input to application 112 via plugin 114.

Plugin 114 facilitates the remote interactive use of application 112 via the system 100 described in FIG. 1. Plugin 114 may also be an extension. In another embodiment, application 112 may be customized for use with the client-server architecture of this invention to the extent that a special plugin is not needed. In yet another embodiment, neither a plugin nor any special application modifications may be needed.

Command process module 146 is adapted to communicate one or more feedback parameters (125) to command process module 126. Command process module 126 is adapted to communicate the one or more feedback parameters 125 to video encoder module 124 and audio encoder module 120 for their respective encoding of the succession of application UI captures 122 and audio captures 118. The one or more feedback parameters 125 may comprise one or more of a wide range of parameters, including a bandwidth parameter relating to at least a portion of network 128, a device parameter of client 1 (400) or a user input for client 1 (400).

The one or more feedback parameters (125) may comprise a bandwidth parameter, which may include any estimated or measured bandwidth data point. An example bandwidth parameter may include estimated bandwidth based on measurements of certain packets traversing between server 200 and client 1 (400), (e.g., how much data sent divided by traversal time to obtain a throughput value), or other bandwidth information obtained from, or in conjunction with, network 128, including from a network protocol. The one or more feedback parameters (125) may comprise user input for client 1 (400), including, for example, a user request for encoding performed in a certain format or manner, with such a request being requested and communicated by viewing application 148. The one or more feedback parameters (125) may comprise a display resolution of client 1 (400) (e.g., CGA, QVGA, VGA, NTSC, PAL, WVGA, SVGA, XGA, etc.). The one or more feedback parameters 125 may comprise other screen parameters (e.g., screen size, refresh capabilities, backlighting capabilities, screen technology, etc.) or other parameters of the client device (e.g., device processor, available memory for use in storing video frames, location if GPS or other location technology-enabled, etc.). None of the example feedback parameters discussed above are meant to exclude their combined use with each other, or other feedback parameters. In some embodiments, video encoder module 124 may be adapted to at least partially base its video sample rate on the one of more feedback parameters (125).

The multiple clients depicted in FIG. 1 are illustrated to indicate that each client may potentially comprise a different type of client device, each with its own one or more feedback parameters.

Figure 4:
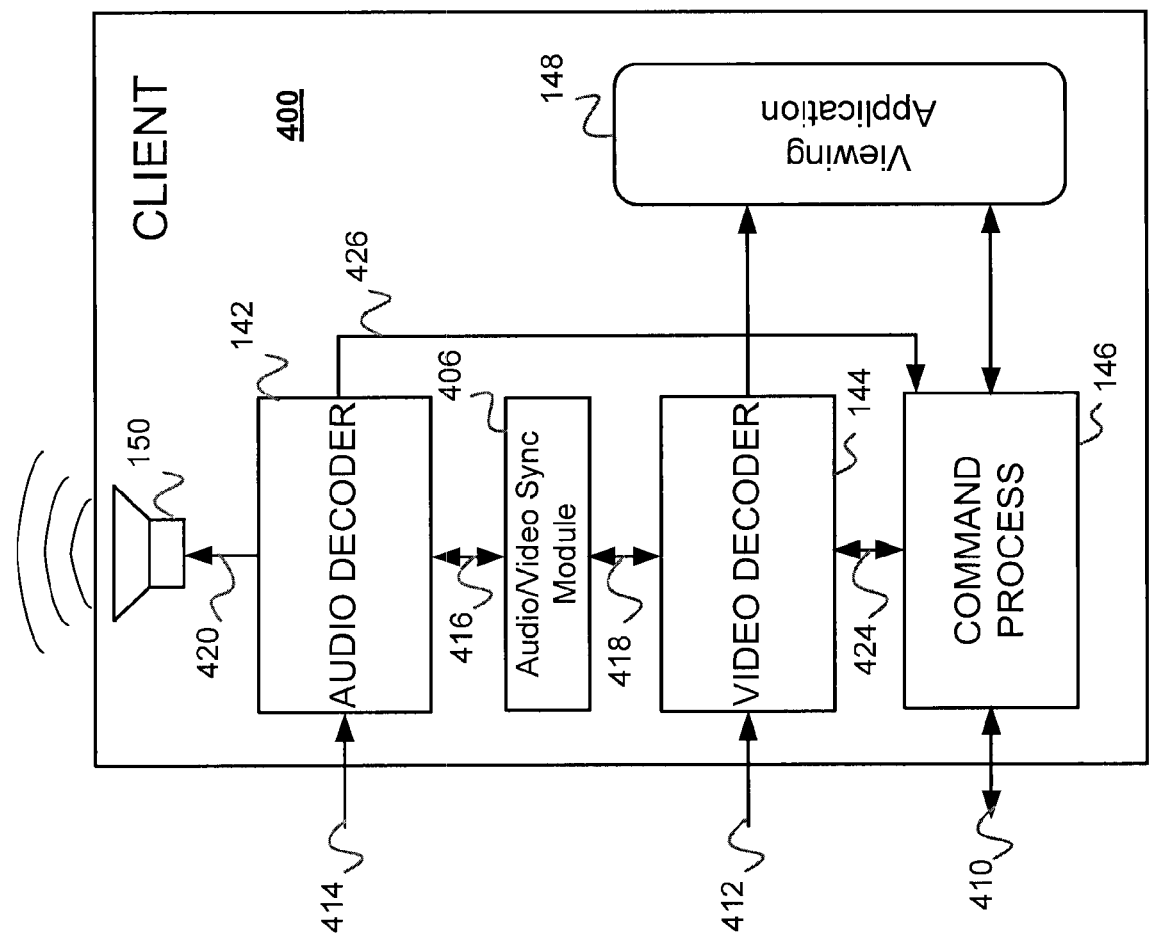
FIG. 4 is a block diagram illustrating some aspects of the present invention in connection with a client, according to one embodiment.

Client 1 (400) is further described herein in FIG. 4.

One skilled in the art will recognize that the client-server architecture illustrated in FIG. 1 is merely an example, and that the invention may be practiced and implemented using many other architectures and environments.

FIG. 2 is a block diagram illustrating some aspects of the present invention in connection with server 200, according to one embodiment. Server 200 includes user manager module 502, server application 1 (102), application 112, plugin 114, audio data generator 116, audio encoder module 120, image management module 216, memory 218, video encoder module 124 (which includes feedback parameter 125), command process module 126, and align module 224. Command process module 126 includes client interpreter sub-module 228, and plugin 114 includes client implementer sub-module 208. The components illustrated in FIG. 2 with the same numbers as components illustrated in FIG. 1 correspond to those respective components of FIG. 1, and thus their general operation will not be repeated. While one running application is illustrated with respect to server 200, server application 102 is illustrated as a representative instance of multiple server applications running on server 200, each of the multiple server applications being associated with its own distinct client (clients are not shown in this illustration).

Image management module 216 serves to capture the UI of application 112 (as the UI would appear on a screen) and save the capture in memory 218. Any capture process such as screen-scraping may be used, and image management module 216 may perform this capture at any desired rate. Image management module 216 also compares the last prior capture of the application UI to the current capture to determine whether any changes have occurred in a particular area of the application UI. Any image/video frame matching process may be used for this comparison operation. Image management module 216 serves to repetitively perform this function.

If image management module 216 detects any change in the particular area of interest, a delta flag is set to indicate that the area of interest has changed. Upon detecting a change, image management module 216 serves to convert the native format of the UI rendered data to a video frame format more suited for compression and transmission to the client device (e.g., color space transformation, data format transformation, etc.). Image management module 216 serves to resize the image for the reformatted video frame. In the embodiment of FIG. 2, multiple parameters of the applicable client device were included in the one or more feedback parameters 125, allowing image management module 216 to perform the reformatting and resizing based on client device parameters (the relevant parameters having been communicated to image management module 216).

Image management module 216 periodically checks (based on its sample interval) if the delta flag has been set. If the delta flag is detected as set during a check, the reformatted/resized video frame in memory 218 is encoded by video encoder module 124 for transmission to the client device.

Client interpreter sub-module 228 of command process module 126 serves to interpret data received from client device 400 and to translate this data for use in connection with video encoder module 124, audio encoder module 120 and application 112 (e.g., user commands, etc.). Client interpreter sub-module 228 serves to pass the feedback parameters 125 to video encoder module 124 and audio encoder 120 for use in encoding.

Client interpreter sub-module 228 of command process module 126 serves to translate client-received data for use in connection with plugin 114 and its client implementer sub-module 208. In communicating back user input, the client device passes coordinates (of a cursor, etc.) relative to the client device's screen to command process 126. Client interpreter sub-module 228 serves to determine the corresponding location in relation to the viewport of the client device and the application UI. Client interpreter sub-module 228 then communicates the translated coordinates to plugin 114 for use by its client implementer sub-module 208. Client implementer sub-module 208 serves to translate from conventional user input to a format appropriate for application 112, and then to directly inject the translated input into application 112.

Align module 224 correlates and cross-stamps video frames encoded by video encoder module 124 and audio encoded by audio encoder module 120, so that the audio stream and the video frames associated with the UI of application 112 may be readily matched at client device 400. Image management module 216 may also serve to time-stamp all images, and the operation of capturing audio from audio data generator 116 may also serve to timestamp the audio stream, both for down-stream alignment by align module 224, as would be appreciated by one skilled in the art. In another embodiment, all alignment/matching of audio and video frames may be performed at the client device.

One skilled in the art will recognize that the illustration of FIG. 2 is merely an example, and that the invention may be practiced and implemented in many other ways.

Figure 3:
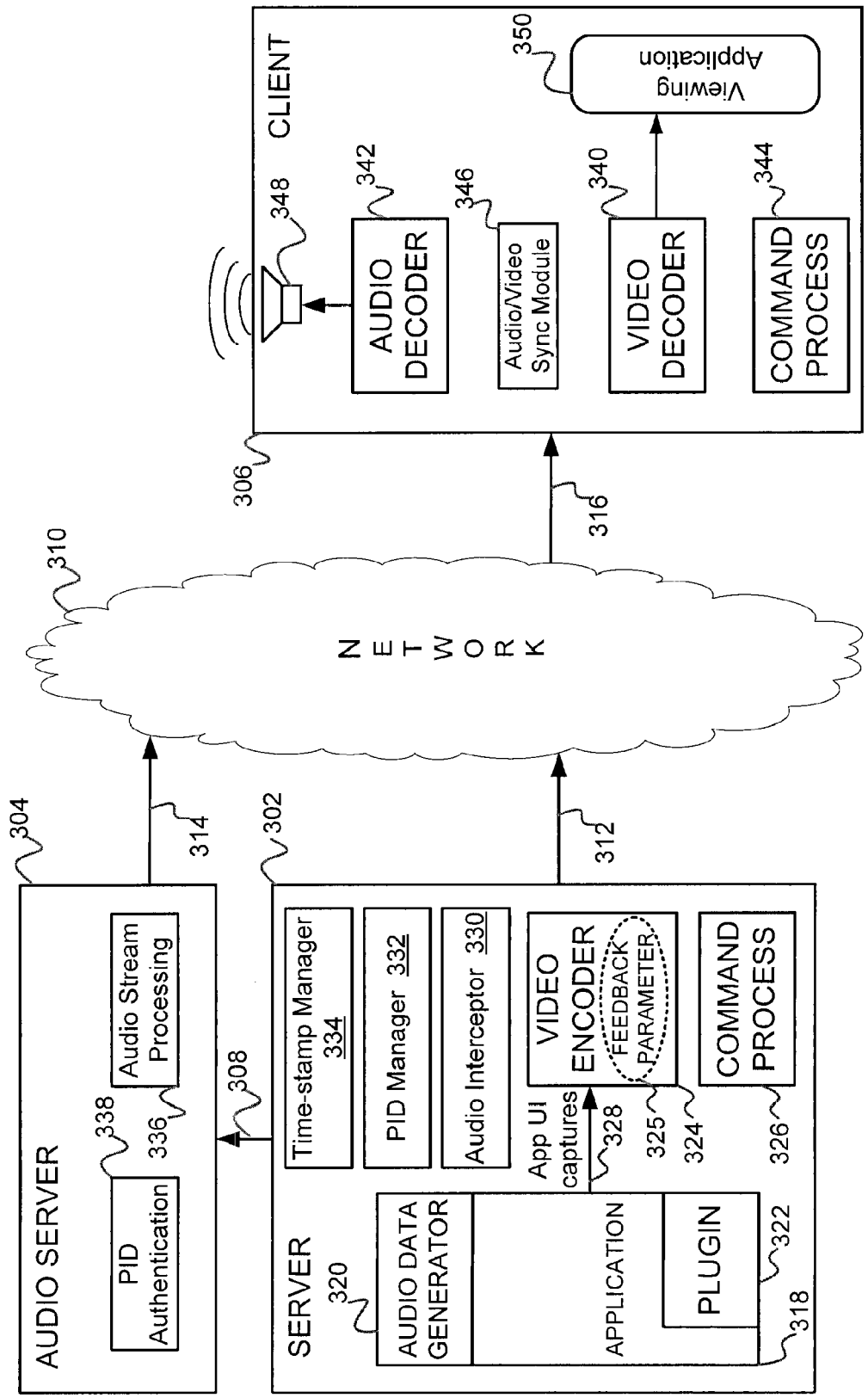
FIG. 3 is a block diagram illustrating some aspects of an architectural overview of the present invention, including a server, an audio server and a client, according to one embodiment.

FIG. 3 is a functional block diagram 300 illustrating some aspects of an architectural overview of the present invention, including a server, an audio server and a client, according to one embodiment. In this embodiment, audio is sent to the client from dedicated audio server 304. Functional block diagram 300 includes server 302, audio server 304 and client 306, with client 306 operatively linked to server 302 and audio server 304 via network 310 (via connections 312, 314 and 316). Server 302 is operatively linked to audio server 304 via connection 308. Server 302 includes application 318, plugin 322, audio data generator 320, video encoder module 324 (including feedback parameter 325), command process module 326, audio interceptor module 330, PID (process identifier) manager module 332, and time-stamp manager module 334.

Video encoder module 324 operates as described in FIG. 2, being analogous to video encoder module 124 (and likewise, for feedback parameter 325 with respect to feedback parameter 125). Video encoder module 324 operates to encode application UI captures 328 and to communicate the encoded video frames for transmission to client 306. In the process of obtaining application UI captures, the resulting UI captures are time-stamped. Time-stamp manager module 334 facilitates the time-stamping of the UI captures. Command process module 326 operates as described in FIG. 2, being analogous to command process module 126.

While one running application is illustrated with respect to server 302, application 318 is illustrated as a representative instance of multiple applications running on server 302, each of the multiple applications having its own video encoder and command process modules, and being associated with its own distinct client. Audio data generator 320 renders an audio stream (not shown) for application 318. Audio interceptor module 330 intercepts or traps this audio stream for redirection to audio server 304, and may timestamp the audio stream. Time-stamp manager module 334 may facilitate the time-stamping of the audio stream. Audio interceptor module 330 may make use of a customized DLL (dynamic link library) to facilitate such a redireaction of the audio stream. PID manager module 332, serves to detect and manage the different process IDs of the multiple applications running on server 302. PID manager module 332 may stamp each audio stream redirected to audio server with the process ID of its associated application.

Audio server 304 includes audio stream processing module 336 and PID authentication module 338. Audio stream processing module 336 serves to encode the audio streams received from the applications running on server 302, and perform any conversion desired (e.g., conversion of sample rates, bit depths, channel counts, buffer size, etc.). In the embodiment of FIG. 3, User Datagram Protocol ports are used (not shown) to direct each audio stream to its destination client device; other protocols may be used in other embodiments. Audio stream processing module 336 directs each audio stream to the port associated with the audio stream's corresponding client device (i.e., the client device displaying the video frames corresponding to the audio stream). Audio stream processing module 336 may work in association with PID authentication module 338 to verify and direct the multiple audio streams streaming from server 302 to the appropriate port.

Client 306 includes video decoder module 340, audio decoder module 342, command process module 344 and audio/video sync module 346. After client 306 receives and decodes the applicable audio and video streams from server 302 (i.e., the audio and video streams of the application instantiated for client 306), audio/video sync module 346 correlates the time-stamps on both streams and works in conjunction with audio decoder module 342 and video decoder module 340 to synchronize output to speaker 348 and viewing application 350, respectively.

One skilled in the art will recognize that the illustration of FIG. 3 is merely an example, and that the invention may be practiced and implemented in many other ways.

FIG. 4 is a block diagram illustrating some aspects of the present invention in connection with a client, according to one embodiment. Client 400 includes video decoder module 144, audio decoder module 142, audio/video sync module 406, command process module 146, speaker 150, viewing application 148, and connections 410, 412 and 414.

Video decoder module 144 receives encoded video frames via connection 412, while audio decoder module 142 receives an encoded audio stream via connection 414. Audio/video sync module 406 serves to match time-stamps or another type of identifier on the audio stream and the video frames for synced output via speaker 150 and viewing application 148, respectively. Audio decoder module 142, video decoder module 144 and viewing application 148 all may serve to provide feedback to command process module 146, to communicate back to the server-side application feedback parameters (not illustrated in FIG. 4), including to vary the sample rate and/or compression of the video encoding, the audio encoding, etc.

Command process module 146 serves to pass feedback parameters of client 400 for use in video and/or audio encoding upon initiation of a session or during a session. Such feedback parameters may include one or more of the following parameters: display resolution, screen size, processor identification or capabilities, memory capabilities/parameters, speaker capabilities, and so forth.

Viewing application 148 displays the succession of video frames of a portion of the server-side application's UI. Viewing application 148 serves to facilitate communicating user input control, including user commands, to command process module 146 for transmission back to the server. Client user input control passed back to the server may include, for example, input from: a keyboard (screen-based or physical, in a variety of forms), scroll wheels, number pads, stylus-based inputs, a touchscreen or touchpad, etc. Viewing application 148 serves to aggregate certain user input for sending, such as opening up a local text box for text entry.

One skilled in the art will recognize that the illustration of FIG. 4 is merely an example, and that the invention may be practiced and implemented in many other ways.

Figure 5:
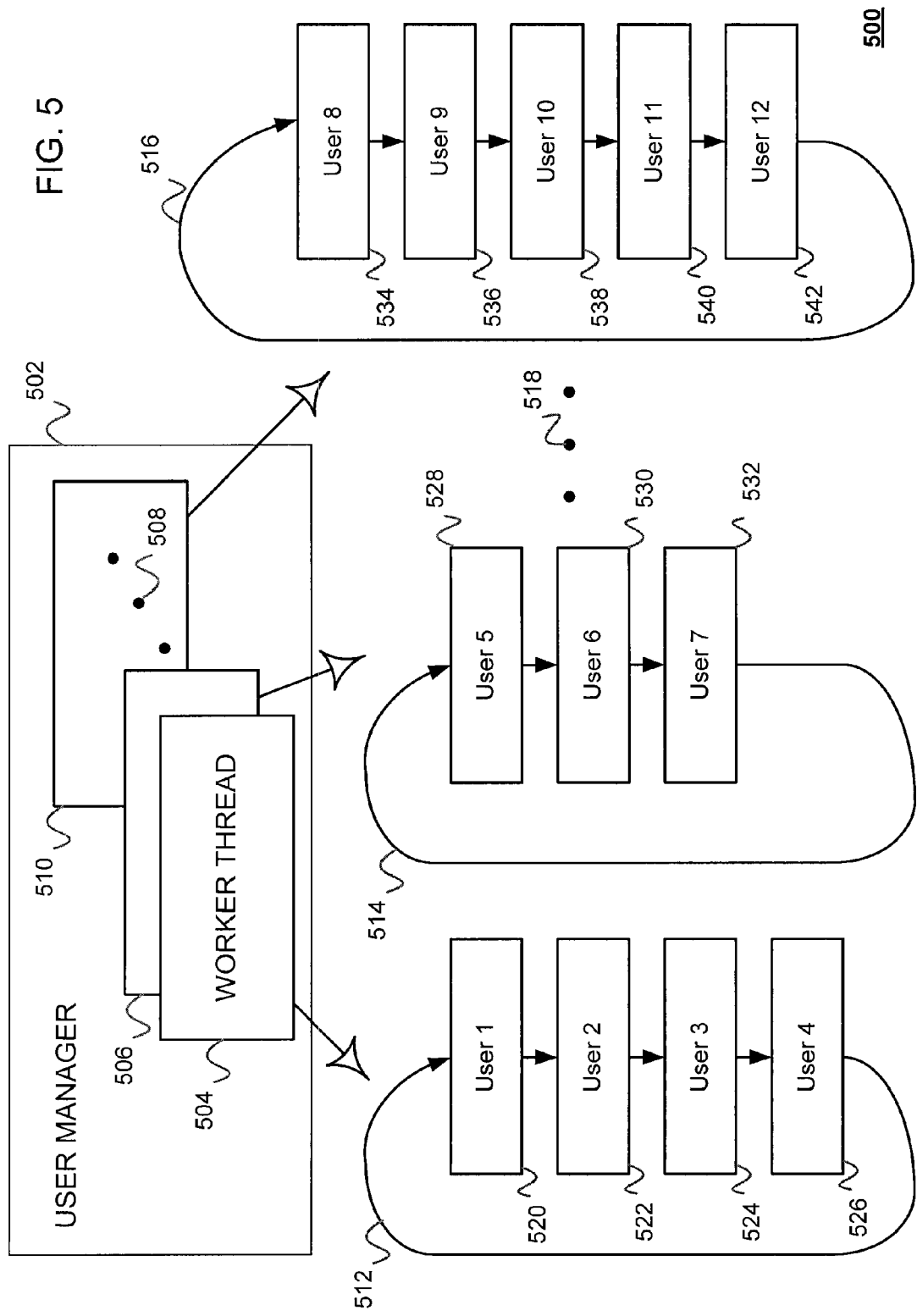
FIG. 5 is a diagram illustrating some aspects of multiple-user software architecture, according to one embodiment.

FIG. 5 is a diagram 500 illustrating some aspects of a multiple-user software architecture, according to one embodiment. User manager module 502 includes worker thread 504, worker thread 506, and a wide-ranging number of additional worker threads (represented by ellipsis 508); with 'worker thread n' being represented by worker thread 510. Worker thread 510 represents the total number of worker threads that happen to be running in the system at any given point. Each worker thread corresponds to a list of active users, and the lists of active users may potentially comprise a different number of active users. As illustrated in FIG. 5, worker thread 504 corresponds to thread cycle 512, worker thread 506 corresponds to thread cycle 514, the variable number of worker threads represented by ellipsis 508 corresponds to the same variable number of thread cycles represented by ellipsis 518, and worker thread 510 corresponds to thread cycle 516. As illustrated in FIG. 5, worker thread 504 cycles through user 1 (520), user 2 (522), user 3 (524) and user 4 (526); worker thread 506 cycles through user 5 (528), user 6 (530) and user 7 (532); and worker thread 516 cycles through user 8 (534), user 9 (536), user 10 (538), user 11 (540) and user 12 (542). The number of users supported by the worker threads illustrated in FIG. 5 is meant to represent a snapshot at an arbitrary point in time, as the number of users supported by any given thread is dynamic.

User manager module 502 may be set to instantiate a finite number of worker threads before instantiating additional worker threads to manage further users added to the system. The number of worker threads in the overall architecture illustrated by FIG. 5 will vary according to various embodiments. The parameters regarding the number of active users assigned per worker thread will also vary according to various embodiments.

User manager module 502 runs on a server (as illustrated in FIG. 1) where multiple instances of applications (as illustrated in FIG. 1) are also running. User manager module 502 thus serves to manage multiple users in an environment of multiple application instances. When a new user is introduced into the overall system of FIG. 1, the new user is assigned to a worker thread (504-510) to facilitate the interaction between a specific client and a specific server-side application.

While the embodiment illustrated in FIG. 5 illustrates multiple users being assigned to a single thread, in other embodiments, a single user may be assigned to their own single thread. In other embodiments, a user may be assigned to either a shared thread or a dedicated thread depending on one or more factors, such as the current loading/usage of the overall system, the user's service policy with the provider of the respective service operating an embodiment of this invention, and so forth.

User manager module 502 facilitates load balancing of multiple users in a number of ways, as each worker thread cycles through their respective list of active users and processes one active event for each user. The active events that may be processed include: (a) send one video frame update to the client or (b) update state information pertaining to the client's viewing application and the server-side application/UI. For illustration purposes for the case in which user 1 is associated with server application 1 (102) of FIG. 1, worker thread 512 will time slice between the respective video encoder/command process modules of users 1 (520) through 4 (526) to perform (a) and (b) above, with video encoder module 124 and command process module 126 comprising the video encoder/command process modules of user 1 (520). A separate thread (not shown) would be operatively coupled to audio encoder module 120 to continuously send the encoded audio stream to the client, when audio data is present to send.

By operating in this manner, no single user suffers as a result of a processing-intensive session (e.g., for a high resolution, high frame rate video) of another user being serviced by the same thread. This will be further described below with reference to FIG. 7. In other embodiments, more than one active event may be processed per user. In other embodiments, a variable number of active events may be processed per user, based on a wide range of factors, including the level of underlying application activity for the applicable user, the user's service policy with the provider of the respective service operating an embodiment of this invention, and so forth.

User manager module 502 may move specific users among different worker threads to load balance among processing-intensive users and processing-light users. For example, if multiple users being serviced by one worker thread are in need of being serviced with high frame rate video, user manager module 502 may move one or more such users to another thread servicing only, or predominately, processing-light users. Another thread may also be instantiated for this purpose. As one skilled in the art would appreciate, a user may be treated as an object, and moved to another thread as objects are transferred among threads. The timing of such object moves may take place at specific junctures in the display of video frames by a client device's viewing application, in order to minimize disruption of a user's experience.

One skilled in the art will recognize that the illustration of FIG. 5 is merely an example, and that the invention may be practiced and implemented in many other ways.

Figure 6:
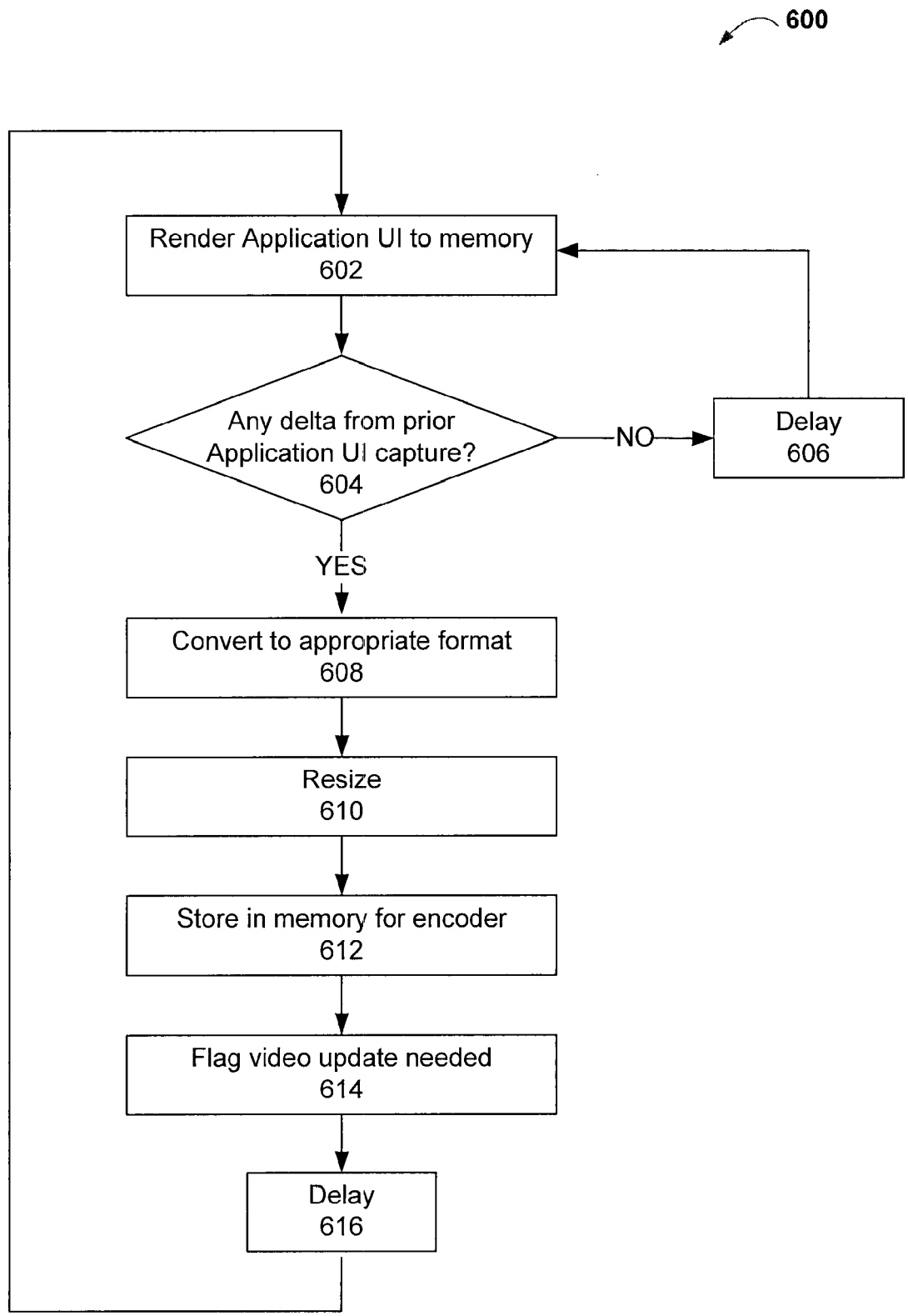
FIG. 6 is a flowchart illustrating some supporting aspects of capturing a succession of video frames, according to one embodiment.

FIG. 6 is a flowchart 600 illustrating some supporting aspects of capturing a succession of video frames, according to one embodiment. Operation 602 (Render Application UI to memory) is performed initially, either by a plugin to an application or by an application itself. Operation 602 serves to capture the UI of an application as the UI would appear on a screen and save the capture in a memory buffer (218 of FIG. 2); actual display of the UI on a screen is not required, but may be used. Operation 604 (Any delta from prior Application UI capture?) then serves to compare the last prior capture of the application UI to the current capture to determine whether any changes have occurred. This delta checking operation may be performed in a wide number of ways, including, for example, hashing pixel blocks of the current UI capture and comparing the hash values to an analogous pixel-hash table generated from the prior UI capture. The hash values may then also be available for potential use in any compression method utilized, e.g., matching blocks of successive video frames, matching blocks against a reference frame, etc. Alternatively, for example, the application may notify the server when a change occurs prior to operation 602.

If operation 604 is determined in the negative, then Operation 606 (Delay) may be implemented by a timer (not shown), before operation 602 is repeatedly performed. If operation 604 is determined in the affirmative, Operation 608 (Convert to appropriate format) is then performed. Operation 608 serves to convert the native format of the UI rendered data to another format more suited for compression and transmission over a network for display on a client device (e.g., color space transformation, data format transformation, etc.).

Operation 610 (Resize) is then performed. Operation 610 serves to resize the native screen size inherent to the UI rendered data to another size more suited for display on a client device (e.g., a cellular phone, a handheld computer, etc.). Operation 610 may make use of one or more feedback parameters (not shown) of the client device communicated to the server-side application and its accompanying video encoder instantiation. Operation 612 (Store in memory for encoder) then follows, storing the converted video frame for use by a video encoder. Operation 614 (Flag video update needed) then follows, setting an indication for use by an operation determining if a video update is needed (see operation 712 (Video update needed?) of FIG. 7). Operation 616 (Delay) then follows, and may be implemented by a timer (not shown), before operation 602 is repeatedly performed.

One skilled in the art will recognize that the illustration of FIG. 6 is merely an example, and that the invention may be practiced and implemented in many other ways.

Figure 7:
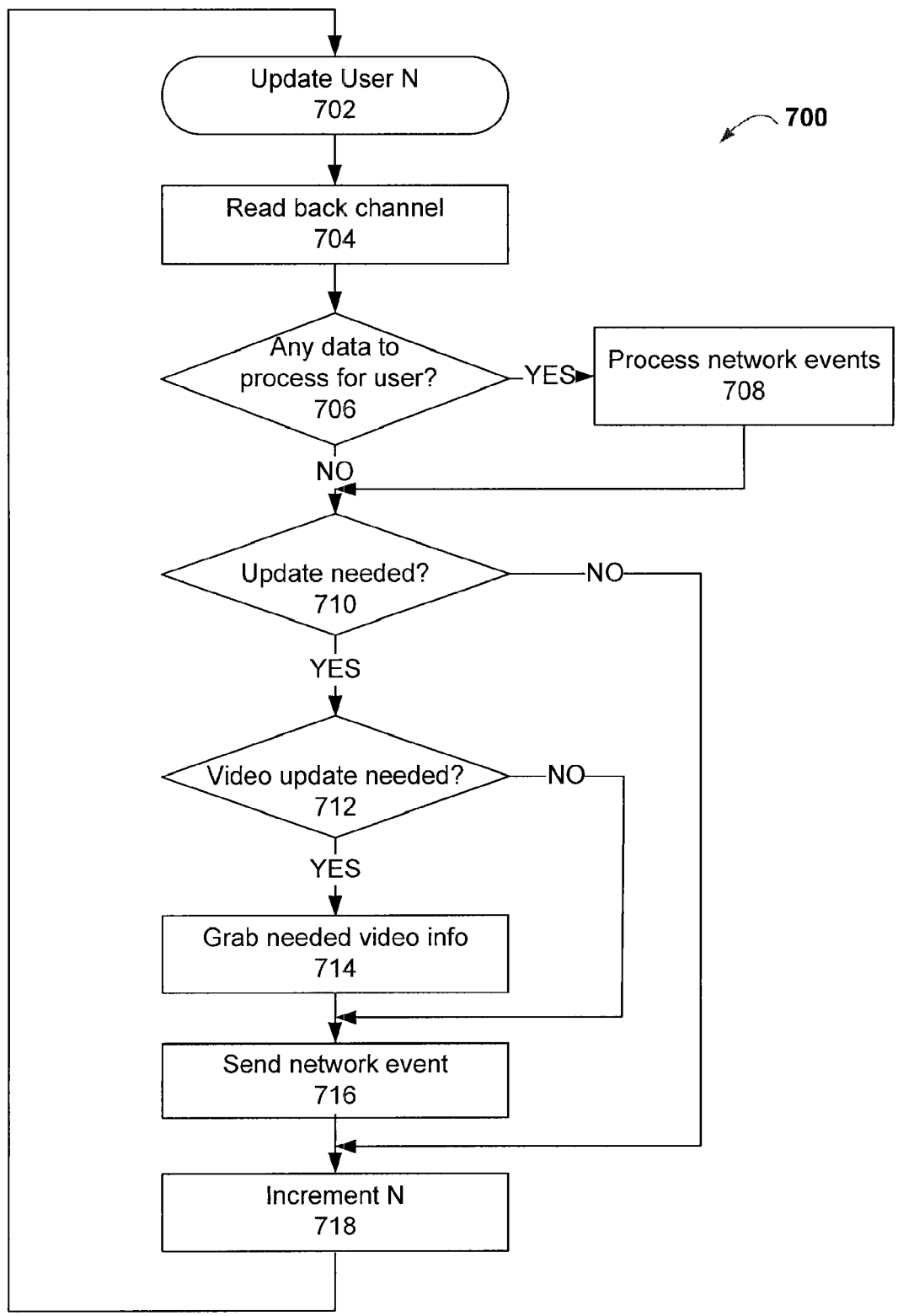
FIG. 7 is a flowchart illustrating some supporting aspects of sending a succession of video frames, according to one embodiment.

FIG. 7 is a flowchart 700 illustrating some supporting aspects of sending a succession of video frames, according to one embodiment. Update User N, 702, represents a start of a sequence of steps, with the sequence of steps representing the steps undertaken by the worker threads of FIG. 5 for each user in the applicable worker thread's list of active users. A worker thread initially performs operation 704, (Read back channel). Operation 706 (Any data to process for user?) then follows, where it is determined if anything pertinent for User N came in from the network that needs to be processed. Responsive to data pertinent to User N being detected, operation 708 (Process network events) then follows. Incoming data pertinent to User N may comprise, for example, information regarding user input to the client device, such as attempting to zoom in on a particular part of the server-side application UI (as shown by a video frame of the server-side application UI displayed on a viewing application running on the client device). Operation 708 may include communicating such processed information to its next destination, e.g., if a zoom command had been sent from the client, the zoom command would be appropriately processed and forwarded to the server-side application before the worker thread proceeded to the next applicable operation.

Either after operation 708 (Process network events) or a negative determination of operation 706 (Any data to process for user?), operation 710 (Update needed?) is then performed. Operation 710 may depend on a counter (not shown) being set when the last video frame for the applicable user was sent, or, more specifically, when operation 712 (Video update needed?) was last performed. If the counter has not yet reached its endpoint, then the worker thread performing the operations will then proceed to operation 718 (Increment N) to commence the sequence of steps illustrated in FIG. 7 for the next applicable user. The counter controls the frame rate for the succession of video frames being communicated from the server to the client, or, more specifically, the allowable frame rate, as will be further described below in relation to operation 712, (Video update needed?). For example, for an allowable frame rate of ten times per second, the counter would be set to count to 100 milliseconds (e.g., from 100 milliseconds down to zero, or vice-versa).

If operation 710 (Update needed?) is determined in the affirmative, then operation 712 (Video update needed?) is performed. Operation 712 may comprise checking a 'video update needed' flag, as was described in relation to FIG. 6, or some such similar operation. Operation 712 serves to determine whether anything has changed in the portion of the server-side application being displayed by the client in the client's viewing application. If operation 712 is determined in the affirmative, operation 714 (Grab needed video info) is then performed. Operation 714 serves to obtain any video frame information needed to update the video frame of an application UI from the last transmitted video frame of the UI, and may make use of a wide range of video frame/compression techniques, including video frame/compression standards, customized methods, and combinations thereof.

Once operation 714 (Grab needed video info) has been performed, operation 716 (Send network event) is then performed. Operation 716 serves to send to the client one video frame update, or updated state information pertaining to the client's viewing application and the server-side application/UI. Operation 716 may post the applicable data for User N to the queue for User N's network connection to effectuate this.

If operation 712 is determined in the negative, operation 716 (Send network event) may be still be performed if there is updated state information pertaining to the client's viewing application and the server-side application/UI.

By transmitting only one video frame update (or state information update) per user, the worker thread servicing multiple users may cycle through and serve all of the users on its active user list without any one user significantly consuming the worker thread's time to the detriment of any other particular user. As the worker thread's load across all of its supported users increases, servicing times for all of the worker thread's active users will gradually increase. Load balancing is thus inherently embedded in this manner. Additional load balancing techniques are described in connection with FIG. 5.

One skilled in the art will recognize that the illustration of FIG. 7 is merely an example, and that the invention may be practiced and implemented in many other ways.

Figure 8:
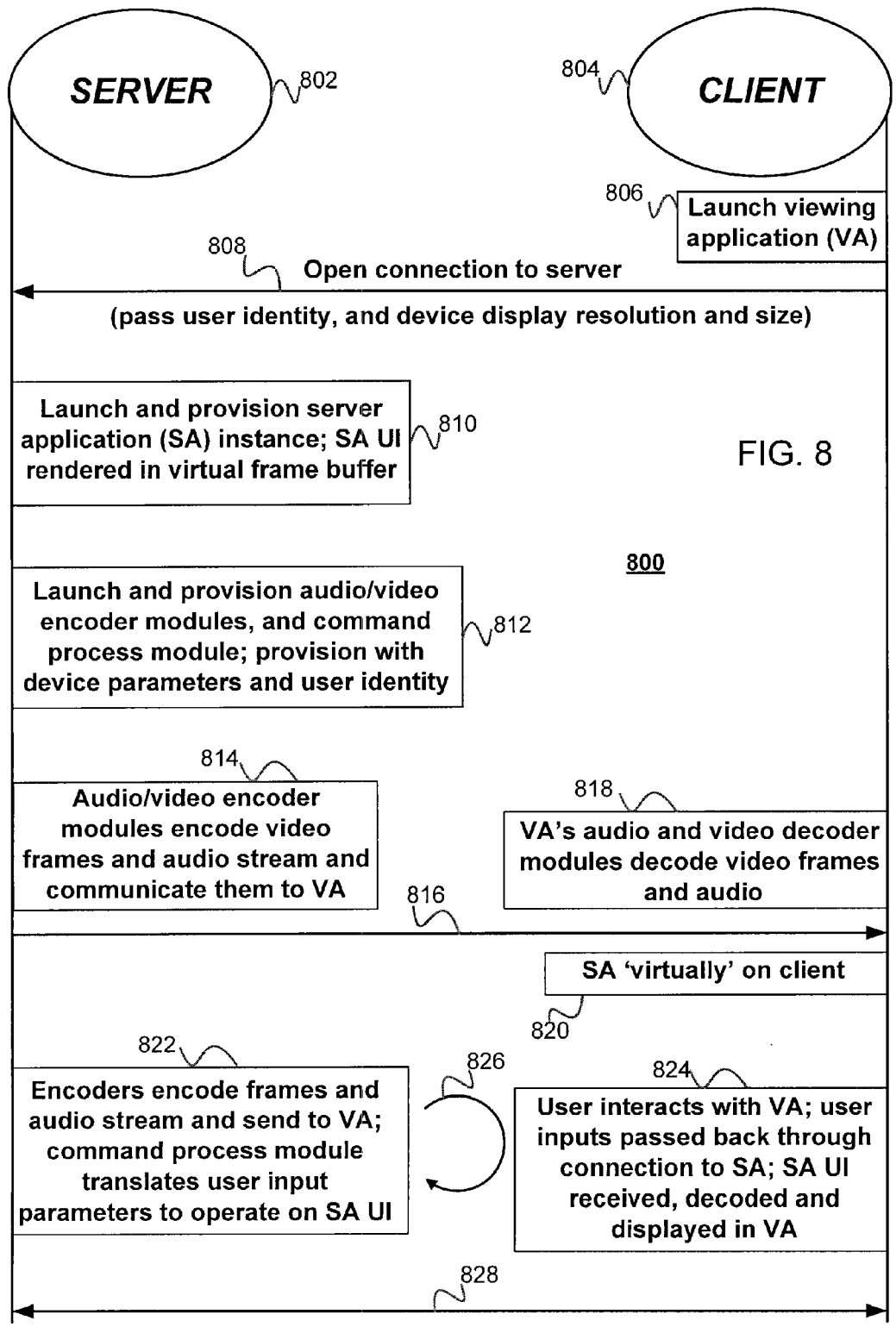
FIG. 8 is a diagram illustrating some aspects of a client-server exchange, according to one embodiment.

FIG. 8 is a diagram illustrating some aspects of client-server exchange 800, according to one embodiment. Client-server exchange 800 depicts a session exchange between server 802 and client device 804. As described herein, server 802 may refer to any server-side machine, and may include a number of servers, either located in one facility or geographically dispersed, operating in conjunction to facilitate the operations described in FIG. 8. These servers may include authentication servers, database servers, etc.

Client device 804 initiates client-server exchange 800 with operation 806, with a user launching a viewing application on client device 804. (The term, client device, is used with respect to FIG. 8 simply because the client device's parameters are discussed throughout; the term, client, could also be used interchangeably.) The viewing application then facilitates opening a connection to server 802 via a network connection via operation 808. Operation 808 makes use of one or more standard Internet protocols, or variations thereof, as would be appreciated by one of skill in the art. Operation 808 serves to pass the user's identity (e.g., by telephone number, carrier account, etc.) and client device's (804) display resolution and size to server 802, for use by server 802 in the session. Server 802 then performs operation 810, which launches and provisions a server application instance, with the server application customized based on the user's preferences. In the present embodiment, the user's preferences are fetched from a database (not illustrated) where they have been associated with the user's identity. Per operation 810, the server application renders in a virtual frame buffer. In another embodiment, the server application may render to a screen.

Operation 812 then follows, where audio/video encoder modules, and an accompanying command process module, are launched and provisioned with client device's (804) display resolution and size for customized encoding for client device 804. The command process and encoder modules may also be provisioned with a level of service associated with the user's identity, providing the particular user with a priority-level with regard to other users using the system. Subsequently, as depicted in operation 814, the video encoder may convert and encode video frames of the server application's UI (e.g., converting the video frames rendered by the server application to QVGA resolution from the server application's native rendering resolution because client device 804 supports QVGA resolution). The video encoder module also resizes the server application's native UI size rendering to suitably fit within, or work together with client device's (804) screen size. The audio encoder module encodes an audio stream output of the server application based on the speaker capabilities of client device 804 (e.g., if client device is known to be a cellular phone, the audio may be encoded such the quality encoded does not exceed the particular phone's speaker capabilities, or of a default level used for cellular phones). Arrow 816 illustrates the communication of the encoded audio and video to client device 804.

Operation 818 subsequently follows, where the viewing application's decoder modules (audio and video) decode the audio and video frames received. The video frames may be displayed in the viewing application on the client, and the audio may be output to client device's (804) speakers (if audio is present and client 804 is not on mute), as depicted by operation 820.

Operation 822 subsequently follows, depicting an on-going series of interactions (represented by arrows 826 and 828) between server 802 and client device 804, also represented by operation 824 on the client side. Operation 822 depicts the server application only sending information to the encoder modules when the UI or audio output change, with the encoders encoding this information for transmittal to client device 804. Thus, if nothing changes regarding the server application's UI or audio, then audio/video information is not encoded and sent to client device 804. A video encoder of server (802) thus asynchronously communicates video frames based on changes in the UI. Video is sent as video frames to display UI changes, and not as commands outside of a video frame format.

Operation 824 depicts the user interacting with the virtual application, with the user's inputs being transformed into parameters and being passed back to the server application. Operation 822 further depicts the server-side command process module translating user input parameters to operate on the server application UI, with the server application UI accordingly changing. Operation 824 completes the cyclical sequence by further depicting the encoded audio and video resulting from user inputs to the virtual application being received, decoded and displayed in the viewing application.

One skilled in the art will recognize that the illustration of FIG. 8 is merely an example, and that the invention may be practiced and implemented in many other ways.

Figure 9:
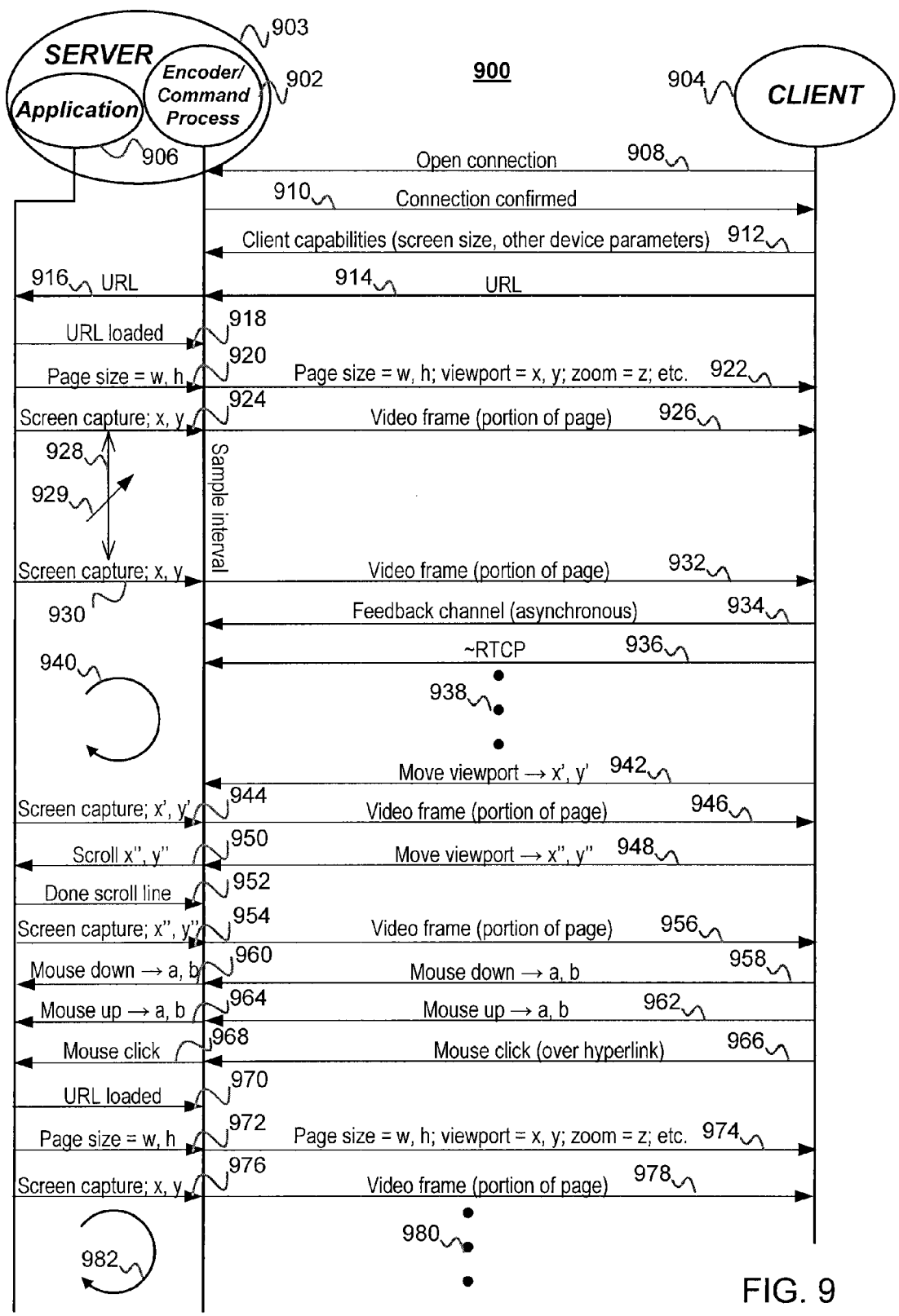
FIG. 9 is a diagram illustrating some aspects of a client-server exchange, including an accompanying exchange within the server, according to one embodiment.

FIG. 9 is a diagram illustrating some aspects of client-server exchange 900, according to one embodiment. Client-server exchange 900 depicts a session exchange between server 903 and client 904, with an accompanying exchange between encoder/command process modules 902 and application 906 (both running on server 903) also being illustrated. Application 906 comprises a web browsing application in this embodiment. Encoder/command process modules 902 comprise audio and video encoder modules and a command process module. References to exchanges with encoder/command process modules 902 may only specifically comprise an exchange with one of these modules, as would be appreciated by one skilled in the art. In another embodiment, a functional element similarly situated as encoder/command process modules 902 may comprise a video encoder module and a command process module, but not an audio encoder module. As described herein, server 903 may refer to any server-side machine, and may include a number of servers, either located in one facility or geographically dispersed, operating in conjunction to facilitate the operations described in FIG. 9. These servers may include authentication servers, database servers, etc.

Client 904 initiates client-server exchange 900 with operation 908, open connection. Server 903 responds with operation 910, connection confirmed. Client 904 then send its capabilities to encoder/command process modules 902, including screen size and other device parameters, via operation 912. The device parameters may include a wide variety of device parameters, including a device processor, memory, screen characteristics, etc. Client 904 then sends a URL via operation 914, which may comprise a saved URL (e.g., a homepage) or a URL entered by the user of client 904. Encoder/command process modules 902 in turn communicate the URL to application 906 via operation 916, and application 906 then loads the URL via operation 918. Application 906 also passes the width (w) and height (h) of the web page associated with the URL to encoder/command process modules 902 via operation 920. Encoder/command process modules 902 then communicates the web page size to client 904, as well as the viewport visible on the client screen, including parameters characterizing the viewport of the client, e.g., a corner coordinate (x, y) and an associated zoom factor (z), via operation 922.

A screen capture of the webpage viewport (the portion of the browser UI that the viewport has been associated with) then takes place via operation 924, in accordance with a number of techniques known in the art. A video frame of the web page visible through the viewport is then communicated to client 904 via operation 926. A subsequent screen capture 930 then takes place after a variable sample interval 928, with the associated video frame being communicated via operation 932. Arrow symbol 929, commonly used to indicate a variable element, is illustrated crossing variable sample interval 928 to indicate this novel feature.

An asynchronous feedback channel provides feedback via operation 934. This feedback may be used to vary the sample interval 928 based on one or more feedback parameters, including client device parameters, user input parameters, and/or estimated bandwidth parameters, such as bandwidth parameters based on measurements of the packets traversing back and forth between server 903 and client 904. RTCP protocol, or a similar such protocol (standardized or customized) may be used in connection with providing such feedback, as illustrated by operation 936. Ellipsis 938 and cycle 940 illustrate the repetitive nature of the interaction between server 903 sending video frames to client 904.

Sample interval 928 may also be at least partially varied based on the rate of change of the underlying webpage being viewed. For example, if little to no change is detected in the underlying webpage being viewed by client 904, then the frame sample interval may be adjusted upward. Likewise, for a very dynamic webpage, or content within a webpage, the frame sample interval may be adjusted downward.

The user of client 904 may move the viewport from which a webpage is being viewed, to view another portion of the webpage, as depicted in operation 942, with x' and y' comprising new parameters of the viewport. The new portion of the webpage that matches the new viewport will then be captured via operation 944, and a video frame of the new viewport will be communicated to client 904 via operation 946.

The user of client 904 may again move the viewport, as depicted in operation 948, with x" and y" comprising new parameters of the viewport. This time, the new viewport extends beyond what would be displayed on the server browser window, and thus the browser itself must scroll to capture the desired portion of the webpage, as depicted in operation 950. Having appropriately scrolled, as depicted via operation 952, a screen capture of the new viewport will then be obtained, as illustrated in operation 954, with the resulting video frame communicated via operation 956.

The user of client 904 may also use a mouse or mouse-equivalent (e.g., finger tap, etc. on a touchscreen, multi-directional button, trackpoint stylus moving a cursor, etc.), as shown via operation 958, where a mouse down motion is made, with the new coordinates of the mouse being passed as (a, b). Client 904 will pass coordinates relative to the client device's screen back to encoder/command process modules 902 in such an operation, with encoder/command process modules 902 determining the corresponding location in relation to the viewport and underlying webpage. In the embodiment being described in FIG. 9, server 903 is running an underlying Windows OS, permitting the injection of a mouse message with the appropriate location information to the window associated with browser 906 (whether there is an actual screen being used for rendering or not). This is illustrated via operation 960, and the screen cursor would resultantly move in application 906, and be communicated back in a video frame to client 904 as described above. In other embodiments being used in conjunction with other operating systems, similar such functions may be used if available, or some analogous other such techniques, as would be appreciated by one skilled in the art.

Operations 962, 964, 966 and 968 depict similar mouse-driven events, which will work in an analogous manner. Other input driven control events (such as a keypad entry) may work in the same manner as well. The types of operations depicted in 970, 972, 974, 976 and 978 have been described above, and ellipsis 980 and cycle 982 serve to illustrate on-going interactions as long as the session between client 904 and server 903 continues.

One skilled in the art will recognize that the illustration of FIG. 9 is merely an example, and that the invention may be practiced and implemented in many other ways.

Figure 10:
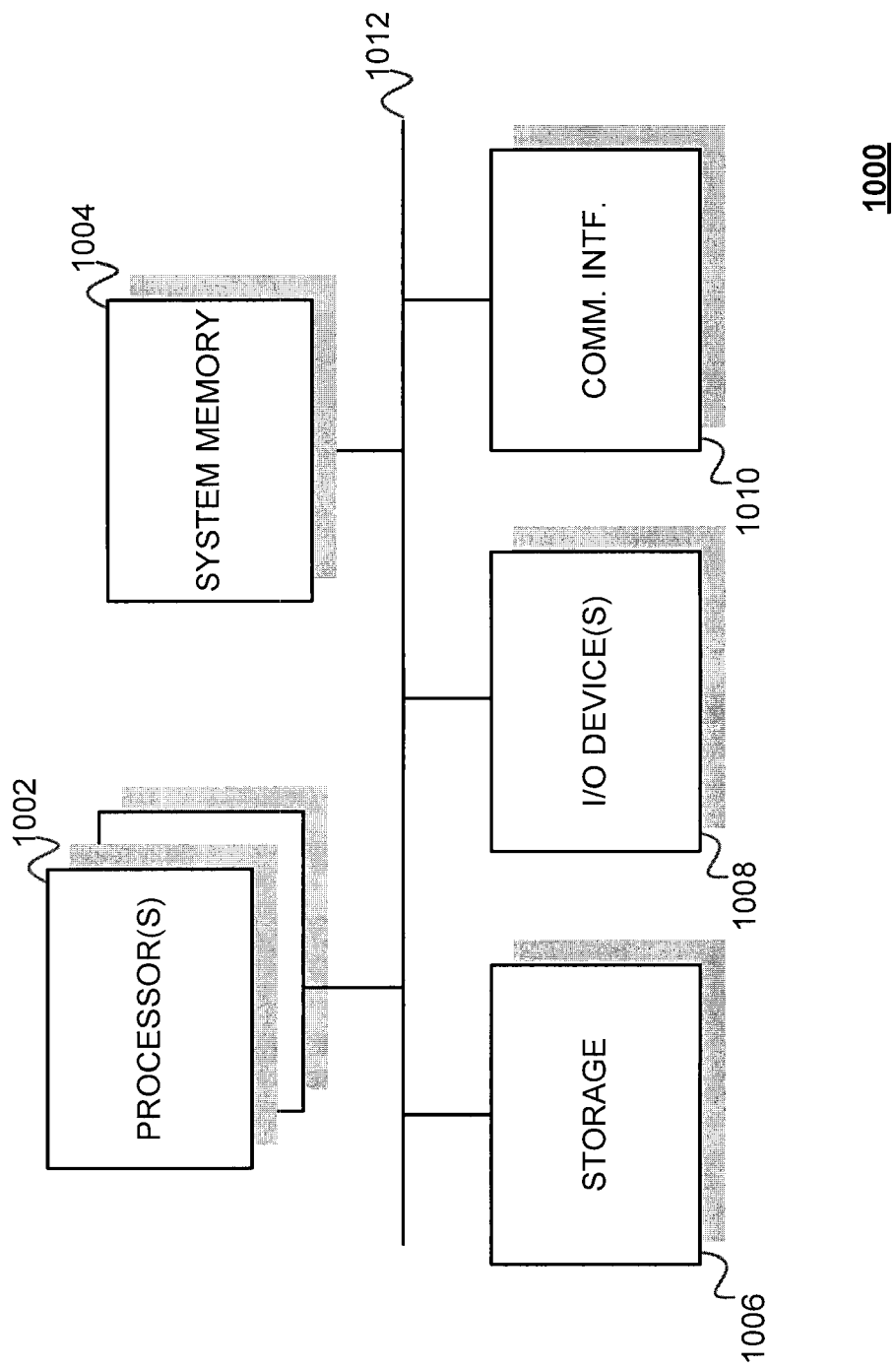
FIG. 10 illustrates an example computer system suitable for use in association with a client-server architecture for remote interaction, according to one embodiment.

FIG. 10 illustrates an example computer system suitable for use in association with a client-server architecture for remote interaction, according to one embodiment. As shown, computer system 1000 may represent either a computer operating as a server, or a computer operating as a client, with the general components illustrated in FIG. 10 potentially varying with each respective representation, as would be appreciated by one of skill in the art. Computer system 1000 may include one or more processors 1002 and may include system memory 1004. Additionally, computer system 1000 may include storage 1006 in the form of one or more devices (such as a hard drive, an optical or another type of disk, electronic memory, including flash memory, and so forth), input/output devices 1008 (as a keyboard (screen-based or physical, in a variety of forms), scroll wheels, number pads, stylus-based inputs, a touchscreen or touchpad, etc.) and communication interfaces 1010 (to connect to a LAN, a WAN, a wired or wireless network, and so forth). The elements may be coupled to each other via system bus 1012, which may represent one or more buses. In the case where system bus 1012 represents multiple buses, the multiple buses may be bridged by one or more bus bridges (not shown). When representing client devices in some embodiments, processor(s) 1002 may comprise a controller, and system memory 1004 and storage 1006 may comprise one cohesive memory component.

These elements each perform their conventional functions known in the art. In various embodiments, computing system 1000 may at least be partially incorporated in a larger computing system. System memory 1004 and storage 1006 may be employed to store a working copy and a permanent copy of the programming instructions implementing various aspects of the one or more earlier described embodiments of the present invention. Any software portions described herein need not include discrete software modules. Any software configuration described above is meant only by way of example; other configurations are contemplated by and within the scope of various embodiments of the present invention. The term, engine, is used herein to denote any software or hardware configuration, or combination thereof, that performs the function or functions referenced.

With respect to some embodiments of the invention, modules have been described to implement various functions. In alternate embodiments, part or all of the modules may be implemented in hardware, for example, using one or more Application Specific Integrated Circuits (ASICs) instead.

In all of the foregoing, it is appreciated that such embodiments are stated only for the purpose of example, and that other embodiments could equally be provided without departing from the essential characteristics of the present invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely by way of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to a system for performing the operations herein. This system may be specially constructed for the required purposes, or it may include a computer (including any type of computer, depending on various embodiments, including a server, personal computer, tablet device, handheld computer, PDA, cellular phone, etc.) selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs, including multi-core designs, for increased computing capability.

The algorithms and operations presented herein are not inherently related to any particular computer or other system. Various general-purpose systems may also be used with programs in accordance with the teachings herein, or it may prove convenient to construct more specialized system to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A server system for communicating video frames across a network, the system comprising:
   an image management engine adapted to capture a succession of user interfaces provided in an application on the server, compare each capture in the succession of captures to a prior capture and identify captures that differ from prior captures, convert identified captures into corresponding video frames and resize the video frames at a variable rate, the conversion based on one or more feedback parameters and video conversion techniques, the resizing based on one or more feedback parameters and image resizing techniques;
   a video encoder engine adapted to encode the video frames for transmission across the network, the encoding based on one or more feedback parameters and including video compression techniques;
   a first command process engine adapted to receive user input; and
   a processor for executing the engines.

2. The system of claim 1, further comprising:
   an audio encoder engine operatively coupled to the-program and adapted to encode an audio stream for transmission across the network, the audio stream associated with the program.

3. The system of claim 1, further comprising:
   a plurality of programs with user interfaces, each having a corresponding plurality of encoder engines and a corresponding plurality of first command process engines, the plurality of programs running in one instance of an operating system; and
   a user manager engine adapted to load balance encoding successions of video frames of each of the plurality of programs for transmission across the network to a corresponding plurality of second devices.

4. The system of claim 1, wherein a succession of captures of a user interface comprises of a succession of screen shots of the user interface.

5. A computer-implemented method for communicating video frames across a network, the method comprising:
  receiving a succession of captures of a user interface of a program;
  comparing each capture in the succession of captures to a prior capture;
  identifying captures that differ from prior captures;
  converting the identified captures of the user interface of the program into corresponding video frames at a variable rate, the conversion based on one or more feedback parameters and video conversion techniques;
  resizing the video frames, the resizing based on one or more feedback parameters and image resizing techniques;
  encoding the video frames, the encoding based on one or more feedback parameters and including video compression techniques;
  receiving a signal corresponding to a user request; and
  communicating the user input to the program.

6. The method of claim 5, further comprising:
  encoding, for transmission across the network, an audio stream, the audio stream associated with the program.

7. The method of claim 5, further comprising:
  encoding a plurality of successions of video frames of user interfaces of a corresponding plurality of programs, the encoding based on one or more feedback parameters corresponding with each program and including video compression techniques, the plurality of programs running in one instance of an operating system;
  receiving user inputs from a plurality of second devices, each second device corresponding one of a plurality of programs; and
  communicating the user inputs to the respective corresponding program.

8. The method of claim 5, wherein the succession of captures corresponds to received user interface data of a program in its native format.

9. A server system for communicating video frames across a network, the system comprising:
  a plurality of image management engines adapted to capture a succession of a plurality of user interfaces provided in a plurality of applications on the plurality of image management engines, compare each capture in the succession of captures to a prior capture, identify captures that differ from prior captures, and convert identified captures into corresponding video frames at a variable rate;
  a plurality of video encoder engines adapted to encode the video frames for transmission across the network, the encoding based on one or more feedback parameters and including video compression techniques;
  a command process engine operatively coupled to the plurality of programs and adapted to receive user input from a second device and communicate the user input to the corresponding program associated with the user input;
  an audio encoder engine operatively coupled to the plurality of programs and adapted to encode a plurality of audio streams corresponding to the plurality of programs;
  an audio interceptor engine operatively coupled to the plurality of programs and the audio encoder engine, and adapted to redirect the plurality of audio streams to the audio encoder engine, wherein the plurality of audio streams are each associated with one of a plurality of process identifiers corresponding to the plurality of programs, and the audio encoder engine is adapted to route the plurality of audio streams based on the associated process identifiers; and
  a processor for executing the engines.

10. The system of claim 9, further comprising:
  a plug-in operatively coupled to the program, the plug-in adapted to receive user input via the command process engine and to transfer the user input for operation in the program.

11. The system of claim 9, further comprising:
  a user manager engine adapted to load balance encoding successions of video frames of each of the plurality of programs for transmission across the network to a corresponding plurality of second devices.

12. The system of claim 11, wherein the plurality of programs are running in one instance of an operating system.

13. The system of claim 11, wherein the user manager engine comprises a plurality of worker threads and is adapted to allocate each user to one of the plurality of worker threads, each worker thread servicing one or more users.

14. The system of claim 9, wherein the succession of captures corresponds to received user interface data of a program in its native format.

15. A computer-implemented method for communicating video frames across a network, the method comprising:
  receiving a succession of captures of program with user interfaces;
  comparing each capture in the succession of captures to a prior capture;
  identifying captures that differ from prior captures;
  converting the identified captures of the plurality of programs that differ from prior captures into corresponding video frames at a variable rate;
  encoding the video frames, for transmission across a network to a corresponding plurality of second devices, the encoding based on one or more feedback parameters and including video compression techniques;
  receiving user input from the plurality of second devices;
  communicating the user input to the corresponding program associated with the user input;
  intercepting a plurality of audio streams corresponding to the plurality of programs;
  associating each of the plurality of audio streams with one of a plurality of process identifiers corresponding to the plurality of programs;
  encoding the plurality of audio streams; and
  routing the plurality of audio streams based on the associated process identifiers.

16. The method of claim 15, further comprising:
  supplementing the program with a plug-in, the plug-in adapted to receive and transfer the user input to the corresponding program for operation in the program.

17. The method of claim 15, wherein the plurality of programs are running in one instance of an operating system.

18. The method of claim 15, further comprising:
  managing and load balancing the encoding of video frames of each of the plurality of programs for transmission across the network to the corresponding plurality of second devices, wherein the managing and load balancing comprises using a plurality of worker threads and allocating each user to one of the plurality of worker threads, each worker thread servicing one or more users.

19. The system of claim 15, wherein the succession of captures corresponds to received user interface data of a program in its native format.

20. A system for receiving video frames from across a network, the system comprising:

a video decoder engine adapted to decode a succession of encoded video frames of a user interface of a program transmitted across the network, the video frames encoded at a variable rate from captures of a user interface of a program based on one or more feedback parameters and video compression techniques, the captures of the user interface selected for encoding based on identification of difference between successive captures a command process engine adapted to communicate user input of the system to the program; and a processor for executing the engines.

21. The system of claim 20, further comprising:

an audio decoder engine adapted to decode an audio stream after transmission across the network, the audio stream associated with the succession of video frames.

22. The system of claim 21, further comprising:

a synchronization engine operatively coupled to the video decoder engine and the audio decoder engine, the synchronization engine adapted to facilitate correlating the audio stream with the succession of video frames for device output.

23. The system of claim 20, further comprising a viewing application, the viewing application operatively coupled to the video decoder engine and adapted to display the succession of video frames, the viewing application further operatively coupled to the command process engine and adapted to facilitate communicating user input to the program.

* * * * *